(12) United States Patent
Fukita et al.

(10) Patent No.: US 6,392,771 B1
(45) Date of Patent: *May 21, 2002

(54) BEARING DEVICE AND DEFLECTING-SCANNING APPARATUS USING THE SAME

(75) Inventors: Taku Fukita, Susono; Mikio Nakasugi, Tama; Yasuo Suzuki; Hideyuki Miyamoto, both of Numazu; Isshin Sato, Shizuoka-ken; Akihiro Fukutomi, Numazu, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/092,995

(22) Filed: Jun. 8, 1998

(30) Foreign Application Priority Data

Jun. 10, 1997 (JP) ............................................. 9-168098
Jun. 12, 1997 (JP) ............................................. 9-155068
Jun. 18, 1997 (JP) ............................................. 9-161196

(51) Int. Cl.[7] ............................................. G02B 26/08
(52) U.S. Cl. ........................ 359/200; 359/198; 347/259
(58) Field of Search ................................. 359/198, 199, 359/200; 310/90, 67 R; 347/259, 260, 261

(56) References Cited

U.S. PATENT DOCUMENTS 4,607,908 A * 8/1986 Ishida et al. ................ 359/200
5,018,880 A 5/1991 Nakasugi et al. ............ 384/112
5,574,322 A * 11/1996 Nii et al. ...................... 310/90
6,031,650 A * 2/2000 Suzuki .......................... 359/198

FOREIGN PATENT DOCUMENTS

JP 06-160751 * 6/1994
JP 8-5951 * 1/1996

* cited by examiner

Primary Examiner—Darren Schuberg
Assistant Examiner—Leo Boutsikaris
(74) Attorney, Agent, or Firm—Fitzpatrick, Cella, Harper & Scinto

(57) ABSTRACT

A bearing device is structured to include a stator portion which includes one of a shaft and a sleeve, a rotor portion which includes the other of the shaft and the sleeve which are structured to be capable of relative rotation therebetween, a first permanent magnet mounted on the rotor portion, and a second permanent magnet mounted at a position opposed to the first permanent magnet. The rotor portion is floated up relative to the stator portion by a magnetic force working between the first permanent magnet and the second permanent magnet. The first permanent magnet is mounted on the upper end portion of the rotor portion, the second permanent magnet is mounted on the upper end portion of the stator portion, and the first permanent magnet and the second permanent magnet are provided in opposed relationship with each other in a circumferential direction perpendicular to an axial direction of the bearing device.

19 Claims, 5 Drawing Sheets

BEARING DEVICE AND DEFLECTING-SCANNING APPARATUS USING THE SAME

BACKGROUND OF THE INVENTION

1. Field of the Invention

This invention relates to a bearing device having a sleeve fitted to a shaft and supporting it for rotation relative to the shaft, and a deflecting-scanning apparatus using the same.

2. Related Background Art

Heretofore, a deflecting-scanning apparatus of this kind has been used in an image forming apparatus such as a laser beam printer or a laser facsimile apparatus, and to make this deflecting-scanning apparatus highly accurate, a highly accurately rotatable bearing device has been required, and a dynamic pressure fluid bearing rotatable in a non-contact manner is used in such a bearing device.

Figure 1:
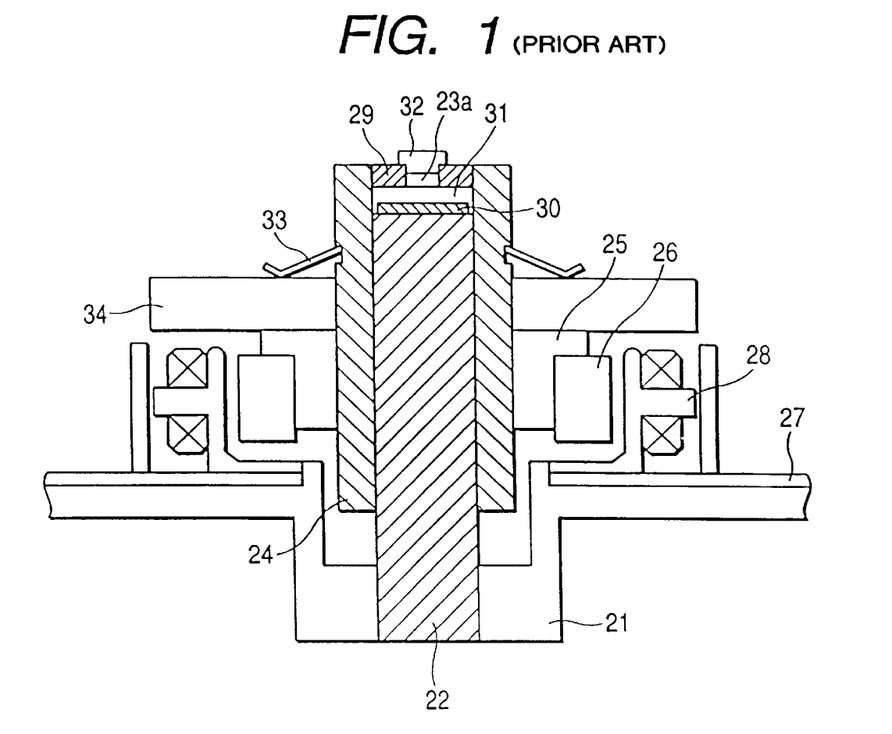
FIG. 1 shows the construction of a bearing device according to the prior art.

FIG. 1 of the accompanying drawings is a cross-sectional view of a deflecting-scanning apparatus using a bearing device by a dynamic pressure fluid bearing which is disclosed in Japanese Laid-Open Patent Application No. 8-5951. A fixed shaft 22 formed of a ceramic material is fixed to the housing 21 of a drive motor, and a rotatable sleeve 24 formed of a ceramic material is rotatably fitted to the fixed shaft 22. Also, a flange 25 formed of aluminum or brass is fixed to the outer periphery of the rotatable sleeve 24 as by shrinkage fitting, and a driving magnet 26 is adhesively secured to the outer periphery of this flange 25. Further, a stator 28 is disposed on a base plate 27 fixed onto the housing 21 so as to be opposed to the driving magnet 26, whereby a drive motor is constituted.

On the other hand, a second permanent magnet 30 is mounted on the upper end of the fixed shaft 22, and a first permanent magnet 29 is fixed to the rotatable sleeve 24 so that magnetic poles of different kinds may be vertically (axially of the fixed shaft) opposed to the second permanent magnet 30.

Thus, the rotatable sleeve 24 is floated up by a magnetic repulsive force and an air pool 31 is created between the fixed shaft 22 and the first permanent magnet 29. Also, a through-hole 23a for communicating the air pool 31 with the outside is provided in the first permanent magnet 29, and a plug 32 is removably mounted in this through-hole 23a. Further, a rotatable polygon mirror 34 is fixed onto the flange 25 by a leaf spring 33 fixed to the rotatable sleeve 24.

When with such a construction, the fixed shaft 22 and the rotatable sleeve 24 are fitted together with the plug 32 being removed, they can be easily fitted together with the air in the rotatable sleeve 24 flowing out of the through-hole 23a. Also, when the rotatable sleeve 24 is rotated, the rotatable sleeve 24 is supported in a radial direction by the air film between the rotatable sleeve 24 and the fixed shaft 22, and is supported in a thrust direction by the repulsive forces of the permanent magnets 29 and 30. At this time, the air in the air pool 31 enveloped by the plug 32 acts so as to attenuate the vertical movement of the rotatable sleeve 24, and holds the rotatable sleeve 24 in its stable floated-up position.

As described above, in this example of the prior art, the two permanent magnets for thrust floating-up are provided so as to be opposed to each other axially of the fixed shaft.

In such a construction, the rotatable sleeve 24 is very unstably vibrated vertically (axially) relative to a disturbance such as vibration to the apparatus. The vertical vibration of the rotatable sleeve is alleviated to some extent by the air pool 31, but it alone is insufficient.

Such vibration of the rotatable sleeve provides the vertical movement of the rotatable polygon mirror mounted thereon, and binders good deflection and scanning.

SUMMARY OF THE INVENTION

It is an object of the present invention to solve the above-noted problem and to provide a bearing device in which the disposition of permanent magnets for thrust floating-up is contrived to thereby prevent the vibration of a rotor portion (a rotatable sleeve or a rotary shaft), and a deflecting-scanning apparatus using the same.

To achieve the above object, a bearing device according to the present invention is structured to include a stator portion which includes one of a shaft and a sleeve, a rotor portion which includes the other of the shaft and the sleeve which are structured to be capable of relative rotation therebetween, a first permanent magnet mounted on the rotor portion, and a second permanent magnet mounted at a position opposed to the first permanent magnet, and wherein the rotor portion is floated up relative to the stator portion by a magnetic force working between the first permanent magnet and the second permanent magnet, and wherein the first permanent magnet is mounted on the upper end portion of the rotor portion, the second permanent magnet is mounted on the upper end portion of the stator portion, and the first permanent magnet and the second permanent magnet are provided in opposed relationship with each other in a circumferential direction perpendicular to an axial direction of the bearing device.

Also, a deflecting-scanning apparatus according to the present invention is structured to include a light source, a deflector for deflectively scanning a light beam from the light source, and a rotating device for rotatively driving the deflector. The bearing device of the rotating device is structured to include a stator portion which includes one of a shaft and a sleeve, a rotor portion which includes the other of the shaft and the sleeve which are structured to be capable of relative rotation therebetween, a first permanent magnet mounted on the rotor portion, and a second permanent magnet mounted at a position opposed to the first permanent magnet, and wherein the rotor portion is floated up relative to the stator portion by a magnetic force working between the first permanent magnet and the second permanent magnet, and wherein the first permanent magnet is mounted on the upper end portion of the rotor portion, the second permanent magnet is mounted on the upper end portion of the stator portion, and the first permanent magnet and the second permanent magnet are provided in opposed relationship with each other in a circumferential direction perpendicular to an axial direction of the bearing device.

Also, to achieve the above object, the bearing device according to the present invention is structured to include a stator portion which includes one of a shaft and a sleeve, a rotor portion which includes the other of the shaft and the sleeve which are structured to be capable of relative rotation therebetween, a first permanent magnet mounted on the rotor portion, and a second permanent magnet mounted at a position opposed to the first permanent magnet, and wherein the rotor portion is floated up relative to the stator portion by a magnetic force working between the first permanent magnet and the second permanent magnet, and wherein the first permanent magnet and the second permanent magnet are provided in opposed relationship with each other in a circumferential direction perpendicular to an axial direction of the bearing device, and one of the first permanent magnet and the second permanent magnet is of such a shape as to surround the other of the first and second permanent magnets.

Also, the deflecting-scanning apparatus according to the present invention is structured to include a deflector for deflectively scanning a light beam, and a rotating device for rotatively driving the deflector. The bearing device of the rotating device is structured to include a stator portion which includes one of a shaft and a sleeve, a rotor portion which includes the other of the shaft and the sleeve which are structured to be capable of relative rotation therebetween, a first permanent magnet mounted on the rotor portion, and a second permanent magnet mounted at a position opposed to the first permanent magnet, and wherein the rotor portion is floated up relative to the stator portion by a magnetic force working between the first permanent magnet and the second permanent magnet, and wherein the first permanent magnet and the second permanent magnet are provided in opposed relationship with each other in a circumferential direction perpendicular to an axial direction of the bearing device, and one of the first permanent magnet and the second permanent magnet is of such a shape as to surround the other of the first and second permanent magnets.

Also, in the above-described example of the prior art, as previously described, a dynamic fluid bearing is used in the bearing portion of the rotatable polygon mirror to thereby cope with the higher speed or the like of the apparatus, but there is a problem still left to be solved that if the pressure force of the leaf spring 33 for assembling the rotatable polygon mirror 34 to the flange 25 is strong, the bearing surface of the rotatable sleeve 24 will be deformed by the reaction force thereof and as the result, the dimension of the bearing gap will change and the performance of the dynamic pressure fluid bearing will be spoiled.

The present invention has been made in view of the above-noted unsolved problem peculiar to the prior art, and an object thereof is to provide a bearing device which can prevent the bearing surface of a rotatable sleeve from being deformed by the pressure force of coupling means such as a spring for assembling a rotatable polygon mirror to the rotatable sleeve to thereby spoil the bearing characteristic and can greatly contribute to improvements in the higher speed and rotational performance of the rotatable polygon mirror, and a deflecting-scanning apparatus using the same.

To achieve the above object, the bearing device of the present invention has a fixed shaft and a rotatable sleeve rotatably fitted to the fixed shaft, and is characterized in that the rotatable sleeve is provided with a level difference portion for locally changing the inner diameter of the rotatable sleeve.

Also, to achieve the above object, the deflecting-scanning apparatus of the present invention has a rotatable polygon mirror which is a deflector for reflecting a light beam, driving means for rotating it, dynamic pressure fluid bearing means provided with a rotatable sleeve rotatably fitted to a fixed shaft, and coupling means for coupling the rotatable polygon mirror integrally to the rotatable sleeve, and is characterized in that the rotatable sleeve is provided with an engagement portion for engaging the coupling means, and a level difference portion for locally changing the inner diameter of the rotatable sleeve in the engagement portion.

Also, design may preferably be made such that the inner diameter of the engagement portion of the rotatable sleeve is locally enlarged by the level difference portion.

Also, a magnet constituting a thrust bearing may preferably be assembled to the level difference.

DESCRIPTION OF THE PREFERRED EMBODIMENTS

The bearing device of the present invention and a deflecting-scanning apparatus using the same will hereinafter be described in detail with respect to embodiments thereof shown in FIGS. 2 to 4.

Figure 2:
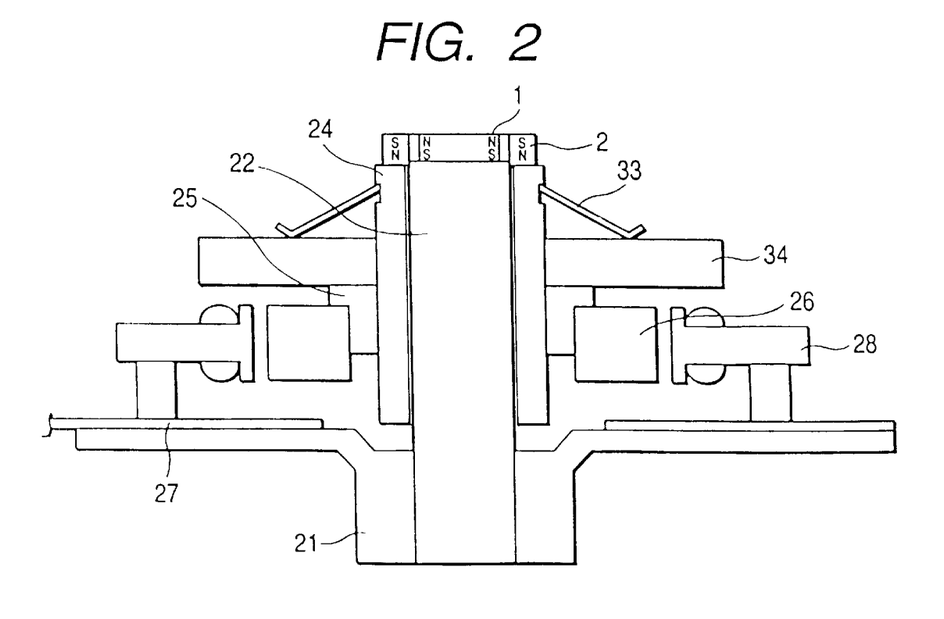
FIG. 2 shows the construction of a first embodiment of the bearing device of the present invention.

FIG. 2 is a cross-sectional view of a first embodiment of the bearing device of the present invention by a dynamic pressure fluid bearing.

Referring to FIG. 2, a fixed shaft 22 (a stator portion) formed of a ceramic material is fixed to the housing 21 of a drive motor, and a rotatable sleeve 24 (a rotor portion) formed of a ceramic material is rotatably fitted to the fixed shaft 22. A flange 25 formed of aluminum or brass is fixed to the outer periphery of the rotatable sleeve 24 as by shrinkage fitting, and a driving magnet 26 is adhesively or otherwise secured to the outer periphery of this flange 25. Further, a stator 28 is disposed on a base plate 27 fixed onto the housing 21, so as to be opposed to the driving magnet 26, whereby a drive motor is constituted.

On the other hand, a circular ring-shaped first permanent magnet 2 is mounted on the upper end portion of the rotatable sleeve 24, and a cylindrically shaped second permanent magnet 1 is mounted on the upper end portion of the fixed shaft 22 at a position opposed to the inner peripheral surface of the first permanent magnet 2 in a circumferential direction (the radial direction of the shaft) perpendicular to an axial direction. The inner peripheral surface of the first permanent magnet 2 and the outer peripheral surface of the second permanent magnet 1 are designed such that magnetic poles opposed to each other in a circumferential direction (the radial direction of the shaft) perpendicular to the axial direction of the fixed shaft are different kinds of magnetic poles.

Thus, the rotatable sleeve 24 is floated up relative to the fixed shaft 22 by a magnetic force working between the first permanent magnet 2 and the second permanent magnet 1. Further, a rotatable polygon mirror 34 is fixed onto the flange 25 by a leaf spring 33 fixed to the rotatable sleeve 24.

Also, when the rotatable sleeve 24 is rotated, the rotatable sleeve 24 is supported in a radial direction by the air film between the rotatable sleeve 24 and the fixed shaft 22 and is supported in a thrust direction by the magnetic force working between the first permanent magnet 2 and the second permanent magnet 1.

As described above, the first permanent magnet mounted on the rotor portion and the second permanent magnet mounted on the stator portion are provided in opposed relationship with each other in the circumferential direction (the radial direction of the shaft) perpendicular to the axial direction, whereby they are supported so as to be opposed to each other on the side of permanent magnets for thrust floating-up and therefore, as compared with the repulsive support in the vertical direction (axial direction) shown in FIG. 1, the positional restraining force in the thrust direction is very much strong, and against disturbance such as the vibration of the apparatus, the vertical vibration of the rotatable sleeve which is the rotor portion becomes very small. The vertical movement of the rotatable polygon mirror mounted on the rotatable sleeve can also be suppressed to a small level.

Also, as compared with the construction of the repulsive support in the vertical direction (axial direction) shown in FIG. 1, the size in the height direction (axial direction) can be made small and therefore, the apparatus can be made compact.

Figure 3:
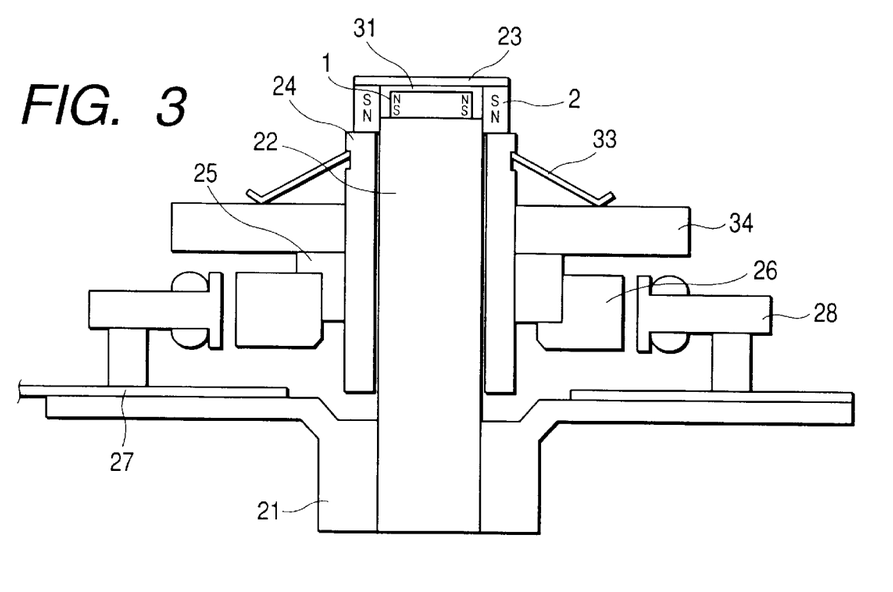
FIG. 3 shows the construction of a second embodiment of the bearing device of the present invention.

FIG. 3 shows a second embodiment of the bearing device of the present invention. In this second embodiment, a cover 23 is provided on the upper end portion of a circulating-shaped first permanent magnet 2 mounted on the upper end portion of a rotatable sleeve 24. The same reference numerals as those in FIG. 2 designate the same members, and need not be described.

In this second embodiment, in addition to the effect of the first embodiment, an air pool 31 is created between the fixed shaft 22 and the cover 23, and the air in this air pool 31 acts so as to attenuate the vertical movement of the rotatable sleeve 24 and therefore, it is possible to hold the rotatable sleeve 24 in a stabler floated-up position than in the first embodiment.

Figure 4:
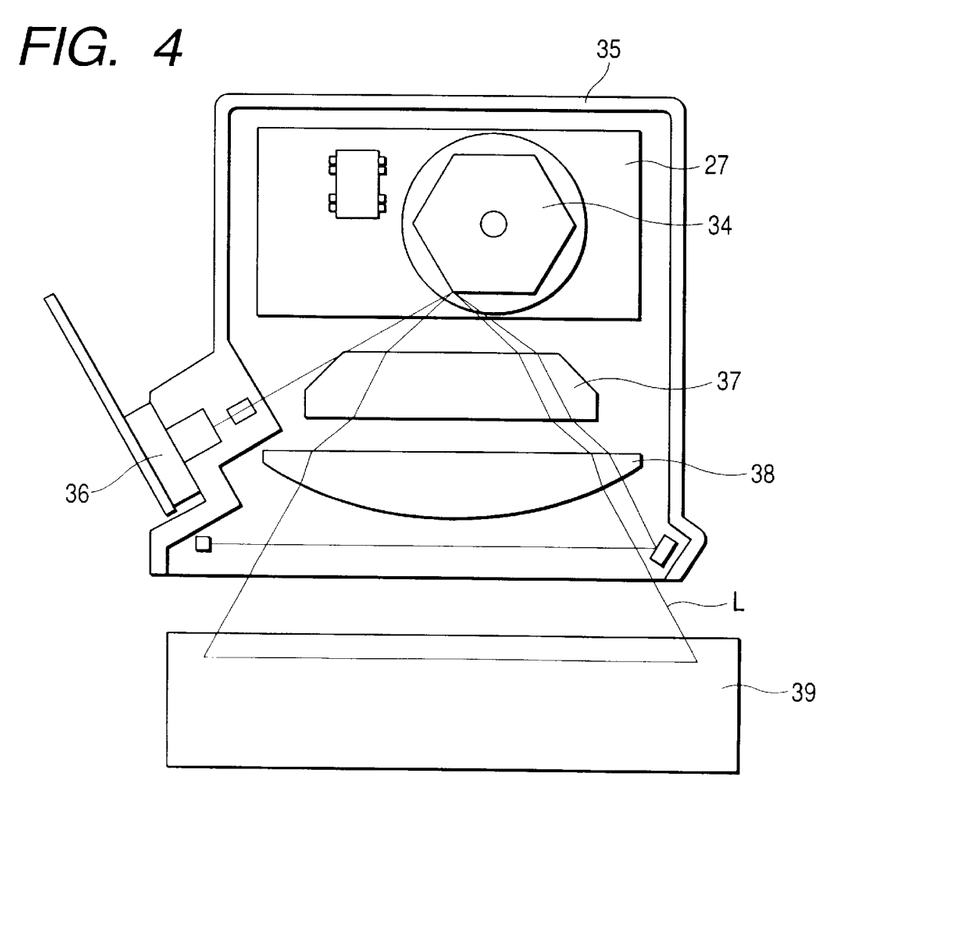
FIG. 4 shows the construction of a deflecting scanning apparatus using the bearing device of the present invention.

FIG. 4 shows the construction of a deflecting-scanning apparatus using the bearing device according to the above-described first or second embodiment. A laser unit 36 is mounted on an optical box 35, and on an optic al path L from the laser unit 36, a rotatable polygon mirror 34 and lenses 37, 38 are disposed in the optical box 35, and a photosensitive member 39 which is a recording medium is disposed outside the optical box 35. The housing 21 of the drive motor is disposed in the optical box 35.

A laser beam emitted from the laser unit 36 is deflected and scanned by the rotatable polygon mirror 34 supported and rotated by the bearing device described above in the first or second embodiment, and is projected as a spotlight onto the photo-sensitive member 39 outside the optical box 35 via the lenses 37 and 38, whereby main scanning is done.

A point image formed on the photosensitive member 39 forms an electrostatic latent image with the main scanning by the rotation of the rotatable polygon mirror 34 and the sub-scanning by the photosensitive member 39 being rotated about the shaft of a rotatable drum.

Around the photosensitive member 39, there are disposed a corona discharger for uniformly charging the surface of the photosensitive member 39, a developing device for visualizing the electrostatic latent image formed on the surface of the photosensitive member 39 into a toner image, a transferring device for transferring the toner image to recording paper, etc., and the recording information by the light beam emitted from the laser unit 36 is printed on the recording paper.

By using the bearing device according to the present embodiment, there can be provided a deflecting-scanning apparatus in which the vertical movement of the rotatable polygon mirror by disturbance such as the vibration of the apparatus can be suppressed and high-speed and highly accurate deflection and scanning are stably possible.

As described above, the bearing device according to the present invention and the deflecting-scanning apparatus using the same are a bearing device comprising a sleeve fitted around a shaft for rotation relative to the latter, one of said shaft and said sleeve being a stator portion and the other being a rotor portion, a first permanent magnet mounted on said rotor portion, and a second permanent magnet mounted at a position opposed to said first permanent magnet, said rotor portion being floated up relative to said stator portion by a magnetic force working between said first permanent magnet and said second permanent magnet, and a deflecting-scanning apparatus using the same, wherein said first permanent magnet is mounted on the upper end portion of said rotor portion, said second permanent magnet is mounted on the upper end portion of said stator portion, and said first permanent magnet and said second permanent magnet are provided in opposed relationship with each other in a circumferential direction perpendicular to an axial direction.

As described above, in the bearing device according to the present invention and the deflecting-scanning apparatus using the same, the permanent magnets for thrust floating-up are provided on the upper end portions of the rotor portion and the stator portion, respectively, so as to be opposed to each other in the circumferential direction perpendicular to the axial direction, whereby the vibration of the rotor portion (rotatable sleeve) can be prevented and high-speed and highly accurate rotation support and deflection and scanning can be made possible.

Figure 5:
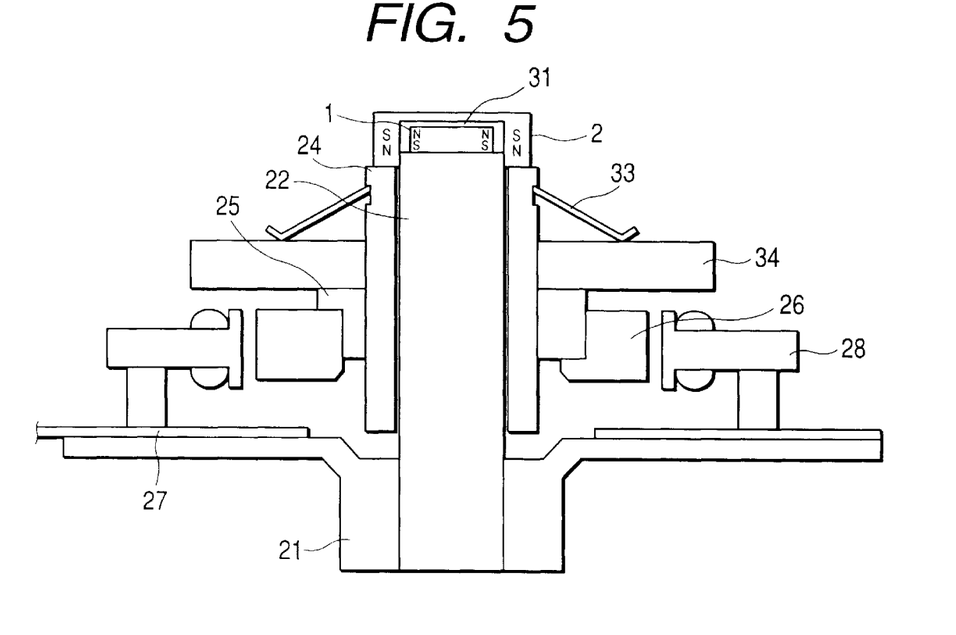
FIG. 5 shows the construction of a third embodiment of the bearing device of the present invention.
Figure 6:
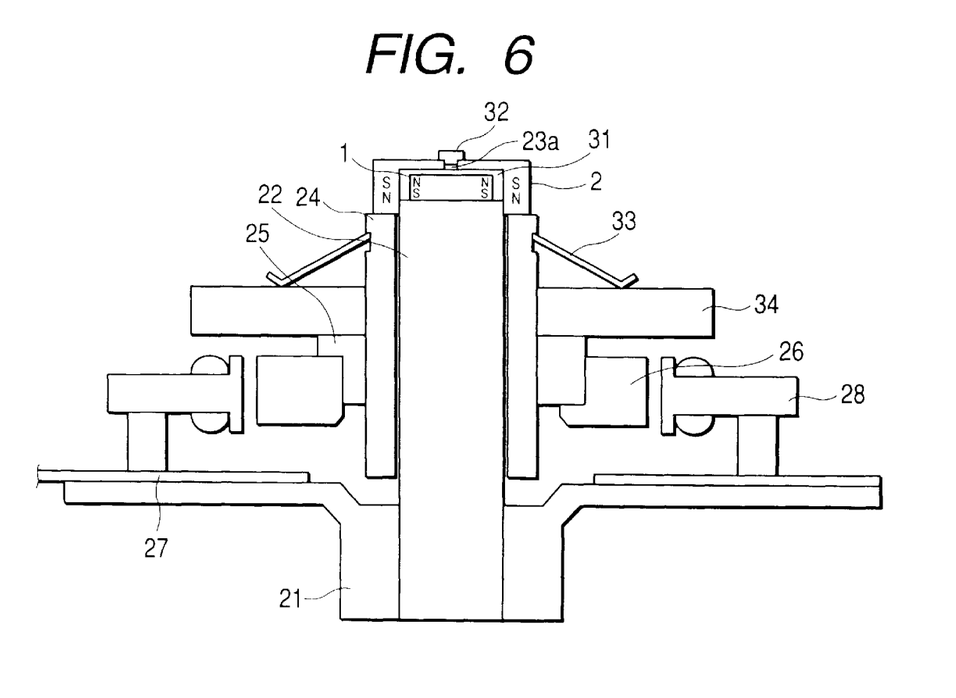
FIG. 6 shows the construction of a fourth embodiment of the bearing device of the present invention.
Figure 7:
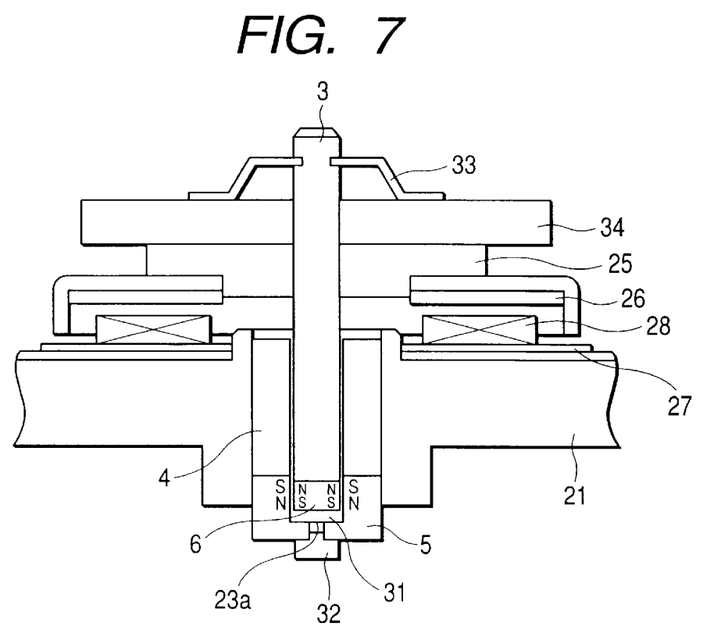
FIG. 7 shows the construction of a fifth embodiment of the bearing device of the present invention.

The invention will be further described in detail with respect to embodiments thereof shown in FIGS. 5 to 7.

FIG. 5 is a cross-sectional view of a third embodiment of the bearing device of the present invention by a dynamic pressure fluid bearing.

Referring to FIG. 5, a fixed shaft 22 (a portion of a stator portion) formed of a ceramic material is fixed to the housing 21 of a drive motor, and a rotatable sleeve 24 (a portion of a rotor portion) formed of a ceramic material is rotatably fitted to the fixed shaft 22. A flange 25 formed of aluminum or brass is fixed to the outer periphery of the rotatable sleeve 24 as by shrinkage fitting, and a driving magnet 26 is adhesively or otherwise secured to the outer periphery of this flange 25. Further, a stator 28 comprised of a coil and a core is disposed on a base plate 27 fixed onto the housing 21, so as to be opposed to the driving magnet 26, whereby a drive motor is constituted.

On the other hand, a circular ring-shaped first permanent magnet 2 is mounted on the upper end portion of the rotatable sleeve 24, and a cylindrically shaped second permanent magnet 1 is mounted on the upper end portion of the fixed shaft 22 at a position opposed to the inner peripheral surface of the first permanent magnet 2 in a circumferential direction (the radial direction of the shaft) perpendicular to an axial direction. The inner peripheral surface of the first permanent magnet 2 and the outer peripheral surface of the second permanent magnet 1 are designed such that magnetic poles opposed to each other in the circumferential direction (the radial direction of the shaft) perpendicular to the axial direction of the fixed shaft are different kinds of magnetic poles. The disposition of the magnetic poles is not restricted thereto.

The circular ring-shaped first permanent magnet 2 is made of plastic and is of such a shape as to cover the upper portion of the second permanent magnet 1 mounted on the upper end portion of the fixed shaft 22. That is, the first permanent magnet 2 made of plastic has a circular ring-shaped portion and a lid-shaped portion magnetized so as to integrally have a thrust-supported magnet function. To form the circular ring-shaped portion and the lid-shaped portion integrally with each other as described above, a permanent magnet made of plastic composed of a magnetic material mixed with resin and injection molded is suitable. Thus, the rotatable sleeve 24 is floated up relative to the fixed shaft 22 by a magnetic force and an air pool 31 (an air damper chamber) is created among the fixed shaft 22, the second permanent magnet 1 and the first permanent magnet 2. Further, a rotatable polygon mirror 34 is fixed onto the flange 25 by a leaf spring 33 fixed to the rotatable sleeve 24.

Also, when the rotatable sleeve 24 is rotated, the rotatable sleeve 24 is supported in a radial direction by the air film between the rotatable sleeve 24 and the fixed shaft 22, and is supported in a thrust direction by a magnetic force working between the first permanent magnet 2 and the second permanent magnet 1. At this time, the air in the air pool 31 enveloped by the first permanent magnet 2 acts so as to attenuate the vertical movement of the rotatable sleeve 24, and can hold the rotatable sleeve 24 in a stable floated-up position.

As described above, the first permanent magnet mounted on the rotor portion and the second permanent magnet mounted on the stator portion are provided in opposed relationship with each other in the circumferential direction (the radial direction of the shaft) perpendicular to the axial direction, whereby they are supported so as to be opposed to each other on the side of a permanent magnet for thrust floating-up and therefore, as compared with the vertical (axial) repulsive support shown in FIG. 1, the positional restraining force in the thrust direction is very much strong and against disturbance such as the vibration of the apparatus, the vertical vibration of the rotatable sleeve which is the rotor portion becomes very small. Therefore, the vertical movement of the rotatable polygon mirror mounted on the rotatable sleeve can also be suppressed to a small level.

Also, as compared with the construction of the vertical (axial) repulsive support shown in FIG. 1, the size in the height direction (axial direction) can be made small and therefore, the apparatus can be made compact.

Also, a cover member for covering the upper portion of the permanent magnet mounted on the upper end portion of the fixed shaft by the use of the permanent magnet made of plastic is integrally molded and formed and therefore, the number of the assembling steps can be decreased and the number of parts can also be decreased, and this leads to a reduction in cost.

FIG. 6 shows a fourth embodiment of the bearing device of the present invention. In this fourth embodiment, a through-hole 23a for communicating the air pool 31 with the outside is formed in the first permanent magnet 2, and a plug 32 is removably mounted in this through-hole 23a. The same reference numerals as those in FIG. 5 designate the same members and need not be described. In this fourth embodiment, in addition to the effect of the third embodiment, when the fixed shaft 22 and the rotatable sleeve 24 are to be fitted together with the plug 32 being removed, the air in the rotatable sleeve 24 flows out of the through-hole 23a and they can be easily fitted together.

FIG. 7 shows a fifth embodiment of the bearing device of the present invention. This fifth embodiment is an embodiment of a deflecting-scanning apparatus using the bearing device by a dynamic pressure fluid bearing of the shaft rotation type, and use is made of a rotary shaft 3 formed of a ceramic material and a fixed sleeve 4 formed of a ceramic material. A groove portion for mounting a leaf spring 33 therein is provided in the upper portion of the rotary shaft 3.

A circular ring-shaped second permanent magnet 5 is mounted on the lower end portion of a fixed sleeve 4 which is a stator portion, and a cylindrically shaped first permanent magnet 6 is mounted on the lower end portion of the rotary shaft 3 at a position opposed to the inner peripheral surface of this second permanent magnet 5 in a circumferential direction (the radial direction of the shaft) perpendicular to an axial direction. The inner peripheral surface of the second permanent magnet 5 and the outer peripheral surface of the first permanent magnet 6 are designed such that magnetic poles opposed to each other in the circumferential direction (the radial direction of the shaft) perpendicular to the axial direction of the rotary shaft are different kinds of magnetic poles.

The circular ring-shaped second permanent magnet 5 is made of plastic and is of such a shape as to cover the lower portion of the first permanent magnet 6 mounted on the lower end portion of the rotary shaft 3. That is, the second permanent magnet 5 made of plastic has a circular ring-shaped portion and a lid-shaped portion magnetized so as to integrally have a thrust-supported magnet function. To form the circular ring-shaped portion and the lid-shaped portion integrally with each other as described above, a permanent magnet made of plastic composed of a magnetic material mixed with resin and injection molded is suitable. Further, a through-hole 23a for communicating an air pool 31 with the outside is formed in the second permanent magnet 5, and a plug 32 is removably mounted in this through-hole 23a. The same reference numerals as those in FIG. 6 designate the same members and need not be described.

In this fifth embodiment, in addition to the effect of the fourth embodiment, the shaft is of a rotary type and therefore a cylindrically shaped magnet small in inertia can be disposed on the rotary member side (the rotor portion side), and this leads to the effect that the inertia of the rotary member can be made small.

The bearing devices according to the above-described third, fourth and fifth embodiments are also used in the deflecting-scanning apparatus as shown in FIG. 4. A laser unit 36 is mounted on an optical box 35, and on an optical path L from the laser unit 36, a rotatable polygon mirror 34 and lenses 37, 38 are disposed in the optical box 35, and a photosensitive member 39 which is a recording medium is disposed outside the optical box 35. The housing 21 of a drive motor is disposed in the optical box 35.

A laser beam emitted from the laser unit 36 is deflected and scanned by the rotatable polygon mirror 34 supported and rotated by the bearing device described above in the third, fourth and fifth embodiments, and is projected as a form of light spot onto the photosensitive member 39 outside the optical box 35 via the lenses 37 and 38, whereby main scanning is done.

Around the photosensitive member 39, there are disposed a corona discharger for uniformly charging the surface of the photosensitive member 39, a developing device for visualizing the electrostatic latent image formed on the surface of the photosensitive member 39 into a toner image, a transferring device for transferring the toner image to recording paper, etc., and recording information by the laser beam emitted from the laser unit 36 is printed on the recording paper or the like.

By using the bearing device according to the present embodiment, there can be provided a deflecting-scanning apparatus in which the vertical movement of the rotatable polygon mirror by disturbance such as the vibration of the apparatus can be suppressed and high-speed and highly accurate deflection and scanning become stably possible and of which the cost can be reduced.

As described above, the bearing device according to the present invention and the deflecting-scanning apparatus using the same are a bearing device comprising a sleeve fitted around a shaft for rotation relative to the latter, one of said shaft and said sleeve being a stator portion and the other being a rotor portion, a first permanent magnet mounted on said rotor portion, and a second permanent magnet mounted at a position opposed to said first permanent magnet, said rotor portion being floated up relative to said stator portion by a magnetic force working between said first permanent magnet and said second permanent magnet, and a deflecting-scanning apparatus using the same, wherein said first permanent magnet and said second permanent magnet are provided in opposed relationship with each other in a circumferential direction perpendicular to an axial direction, and said first permanent magnet or said second permanent magnet is of such a shape as to cover said second permanent magnet or said first permanent magnet provided on the end portion of said shaft.

As described above, in the bearing device according to the present invention and the deflecting-scanning apparatus using the same, the permanent magnets for thrust floating-up are provided on the end portions of the rotor portion and the stator portion so as to be opposed to each other in the circumferential direction perpendicular to the axial direction, whereby the vibration of the rotor portion (the rotatable sleeve or the rotary shaft) can be prevented and high-speed and highly accurate rotation support and deflection and scanning are made possible, and an air damper chamber can also be constructed by the use of the permanent magnets for thrust floating-up and therefore, the cost can be reduced.

Figure 8:
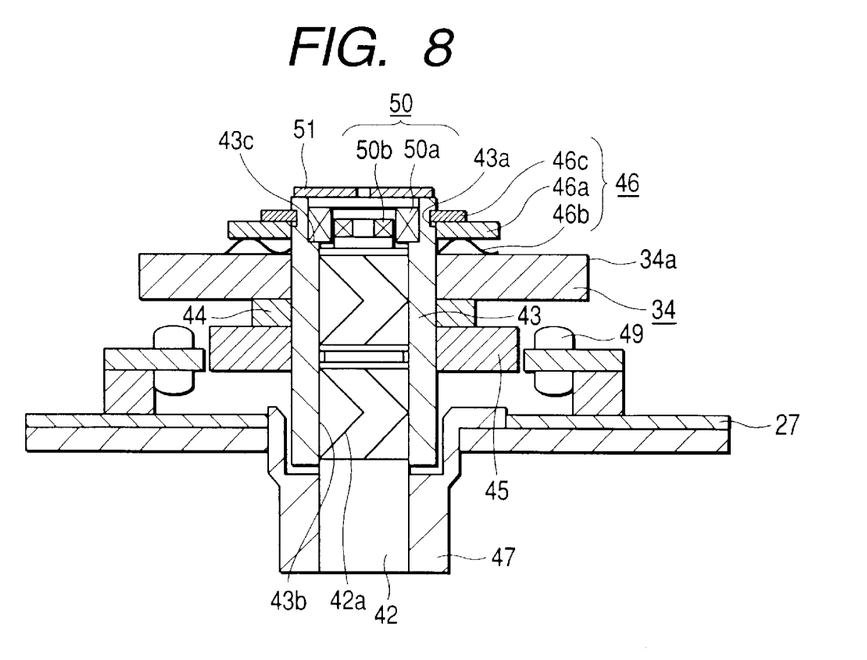
FIG. 8 shows the construction of a sixth embodiment of the bearing device of the present invention.
Figure 9:
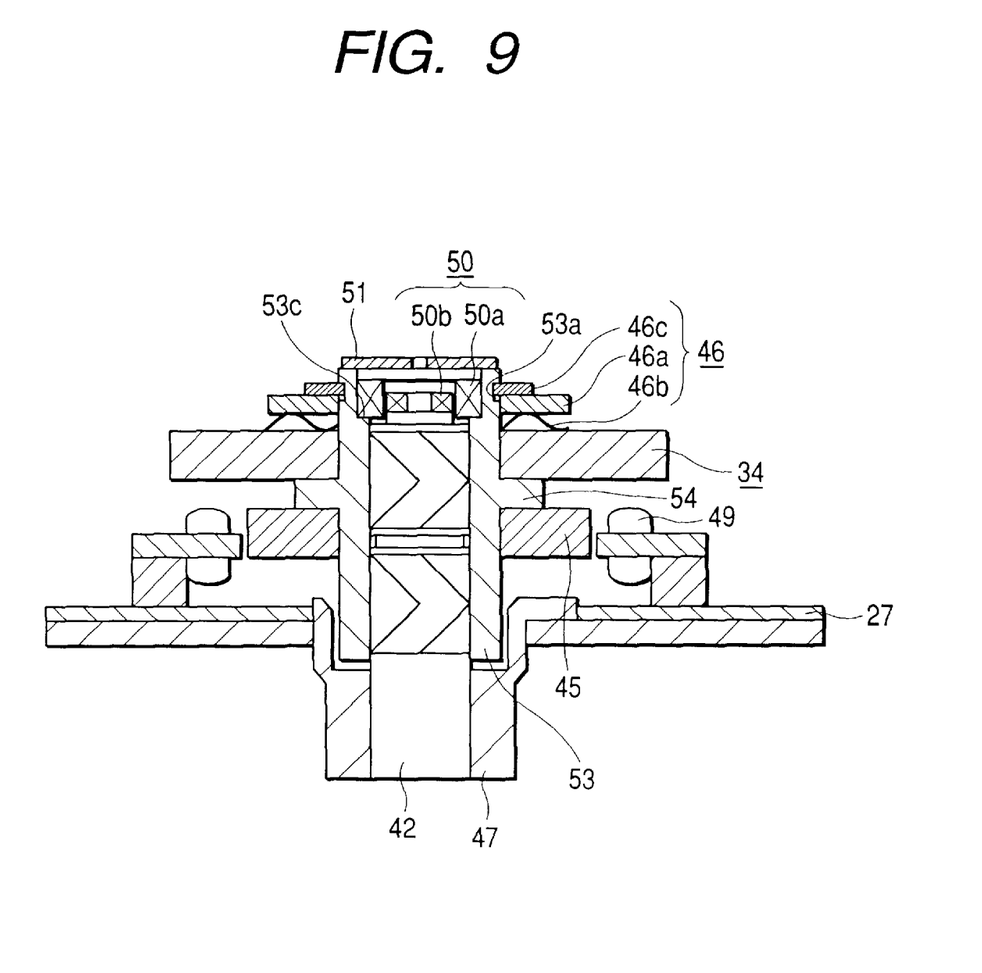
FIG. 9 shows the construction of a seventh embodiment of the bearing device of the present invention.

The invention will be further described in detail with respect to embodiments thereof shown in FIGS. 8 and 9.

FIG. 8 shows the essential portions of a sixth embodiment of the bearing device of the present invention. In this embodiment, a washer 44 which is a flange is made integral with a rotatable sleeve 43 fitted to a fixed shaft 42 and constituting dynamic pressure fluid bearing means and a rotor magnet 45 is secured to the washer 44, and a rotatable polygon mirror 34 is urged against the washer 44 by a resilient urging mechanism 46 which is coupling means and integrally coupled thereto and a motor base plate 27 is supported by a motor housing 47 to which the fixed shaft 42 is fixed, and the rotor magnet 45 constitutes a motor which is driving means with a stator coil 49 uprightly provided on the motor base plate 27. This motor rotates the rotor magnet 45 and the rotatable polygon mirror 34 together with each other by the stator coil 49 being excited. As described above, the coupling means is designed to couple the rotatable polygon mirror 34 integrally to the rotatable sleeve 43 through the washer 44.

The rotatable sleeve 43 forms air film between it and the fixed shaft 42 by the rotation thereof and constitutes dynamic pressure fluid bearing means rotated in non-contact with the fixed shaft 42. As described above, by using the dynamic pressure fluid bearing in the bearing portion of the rotatable polygon mirror 34, the higher speed of the deflecting-scanning apparatus can be expedited to thereby improve the rotational performance thereof.

The resilient urging mechanism 46 for urging the rotatable polygon mirror 34 against the washer 44 has a fixed ring 46a and an E-ring 46c for urging the fixed ring 46a against the rotatable polygon mirror 34 through a spring 46b, and the E-ring 46c is engaged with an annular groove portion 43a provided in the rotatable sleeve 43.

The fixed shaft 42 and rotatable sleeve 43 constituting the dynamic pressure fluid bearing are made of a ceramic material such as high strength silicon nitride ($Si_3N_4$) or a metallic material having its surface plated with a wear resisting material in order to reduce the friction between the two and prevent the galling or the like by the entry of dust or the like. The washer 44 is made of a metal such as aluminum or brass and is made integral with the rotatable sleeve 43 by shrinkage fitting, and the rotor magnet 45 is adhesively or otherwise secured to the washer 44.

When the spring pressure (pressure force) by the spring 46b of the resilient urging mechanism 46 is strong, the inner peripheral surface of the upper portion of the rotatable sleeve 43 is deformed by a reaction force created in the groove portion 43a of the rotatable sleeve 43. When such deformation of the inner peripheral surface spreads to the bearing surface 43b of the rotatable sleeve 43 which faces the dynamic pressure generating groove 42a of the fixed shaft 42, the dimension of the bearing gap changes and the bearing characteristic as designed cannot be obtained.

For this reason, in the tip end portion (engagement portion) of the rotatable sleeve 43 having the groove portion 43a, the inner diameter thereof is locally changed to form a level difference 43c to the bearing surface 43b. This level difference 43c serves to locally enlarge the inner diameter of the rotatable sleeve 43 to thereby prevent the deformation in the tip end portion of the rotatable sleeve 43 from spreading to the bearing surface 43b of the rotatable sleeve 43.

Simply by providing the simple level difference on the inner peripheral surface of the rotatable sleeve 43, the bearing characteristic of the dynamic pressure fluid bearing can be prevented from being degraded due to the spring pressure of the resilient urging mechanism 46. The bearing performance of the rotatable polygon mirror 34 is improved in this manner, whereby the rotational performance of the deflecting-scanning apparatus can be stabilized and the higher speed thereof can be expedited.

A magnet 50a is assembled to the level difference portion 43c of the rotatable sleeve 43. This magnet is opposed to a magnet 50b secured to the upper end of the fixed shaft 42, and the two magnets 50a and 50b together constitute a thrust bearing 50 for axially supporting the rotatable sleeve 43 and keeping the lower end of the rotatable sleeve 43 in non-contact with a motor housing 47. The inside of the groove portion 43a of the rotatable sleeve 43 is reinforced by the magnet 50a assembled to the level difference portion 43c, and this also leads to the advantage that the amount of deformation by the urging force of the resilient urging mechanism 46 can be reduced.

Also, the upper end opening of the rotatable sleeve 43 is closed by a lid member 51, whereby an air pool is formed on the upper end of the fixed shaft 42. This air pool, with the thrust bearing 50 comprising the magnets 50a and 50b, serves to stabilize the axial position of the rotatable sleeve 43.

While in the present sixth embodiment, the resilient urging mechanism including the spring and the E-ring is used to couple the rotatable polygon mirror to the washer integral with the rotatable sleeve, utilization can also be made of simple coupling means in which the inner end of a belleville spring or the like is directly engaged with the groove portion of the rotatable sleeve.

FIG. 9 shows a seventh embodiment of the bearing device of the present invention. In this embodiment, a flange portion 54 against which the underside of a rotatable polygon mirror 34 bears is integrally provided on a rotatable sleeve 53 made of a metal and the washer 44 of the device of FIG. 8 is omitted. The number of the assembled parts of the device can be curtailed and the manufacturing cost thereof can be reduced and moreover, there is the advantage that the working of the groove portion 53a and the level difference 53c is simple because the rotatable sleeve 53 is made of a metal.

The bearing devices of the above-described sixth and seventh embodiments are both used in the deflecting-scanning apparatus as shown in FIG. 4. A laser unit 36 is mounted on an optical box 35, and on an optical path L from the laser unit 36, a rotatable polygon mirror 34 and lenses 37, 38 are disposed in the optical box 35, and a photosensitive member 39 which is a recording medium is disposed outside the optical box 35. The housing 21 of a drive motor is disposed in the optical box 35.

A laser beam emitted from the laser unit 36 is deflected and scanned by the rotatable polygon mirror 34 supported and rotated by the bearing device described in the sixth or seventh embodiment, and is projected as a spotlight onto the photosensitive member 39 outside the optical box 35 via the lenses 37 and 38, whereby main scanning is done.

Around the photosensitive member 39, there are disposed a corona discharger for uniformly charging the surface of the photosensitive member 39, a developing device for visualizing an electrostatic latent image formed on the surface of the photosensitive member 39 into a toner image, a transferring device for transferring the toner image to recording paper, etc., and the recording information by the laser beam emitted from the laser unit 36 is printed on the recording paper or the like.

As described above, in the deflecting-scanning apparatus of the present invention, the rotatable polygon mirror 34 abuts against the washer 44 integral with the rotatable sleeve 43, and is integrally coupled to the rotatable sleeve 43 by the resilient urging mechanism 46. The rotatable sleeve 43 has a groove portion 43a for assembling the resilient urging mechanism 46, and this portion is apt to be deformed by the reaction force of the urging force of the resilient urging mechanism 46. So, a level difference 43c is provided between the upper end portion of the rotatable sleeve 43 having the groove portion 43a and the bearing surface 43b to thereby prevent the deformation by the resilient urging mechanism 46 from spreading to the bearing surface 43b.

According to the present invention, there is constructed a dynamic pressure fluid bearing for rotatably supporting a rotatable polygon mirror or the like by air film formed between a fixed shaft and a rotatable sleeve. This is because if the rotatable polygon mirror is coupled to the rotatable sleeve by coupling means, a reaction force such as the pressing force of the coupling means may be applied to the engagement portion of the rotatable sleeve to thereby deform the bearing surface, whereby the bearing performance of the dynamic pressure fluid bearing may be spoiled. So, a level difference for locally changing the inner diameter of the engagement portion of the rotatable sleeve is provided so that even if the engagement portion of the rotatable sleeve is deformed by the above-mentioned coupling means, the deformation may be absorbed by the level difference and prevented from spreading to the bearing surface.

The present invention is constructed as described above and therefore achieves the following effects.

It can be avoided that the rotatable sleeve is deformed by the resilient urging mechanism or the like for assembling the rotatable polygon mirror to the rotatable sleeve and the bearing performance of the dynamic pressure fluid bearing is spoiled. Thereby, the present invention can greatly contribute to an improvement in the rotational performance of the deflecting-scanning apparatus and the higher speed thereof.

By using such a deflecting-scanning apparatus, there can be realized an image forming apparatus of high performance suited for a higher speed.

What is claimed is:

1. A bearing device comprising:
   a rotor portion comprising one of a shaft and a sleeve, said shaft being fitted into said sleeve so as to be capable of relative rotation between said shaft and said sleeve;
   a stator portion comprising the other of said shaft and said sleeve;
   a first permanent magnet mounted on the end portion of said sleeve;
   a second permanent magnet mounted on the end portion of said shaft so as to be opposed to said first permanent magnet in a direction perpendicular to an axial direction; and
   a cover mounted on said first permanent magnet to cover the second permanent magnet mounting end portion of said shaft, wherein said cover and said first permanent magnet envelope the space formed between said cover and the second permanent magnet mounting end portion of said shaft so as to form an air pool.

2. A bearing device according to claim 1, wherein said rotor portion is floated up relative to said stator portion by a magnetic force working between said first permanent magnet and said second permanent magnet.

3. A bearing device according to claim 1, wherein said rotor portion is a rotatable sleeve, and said stator portion is a fixed shaft.

4. A bearing device according to claim 1, wherein said shaft and said sleeve are formed of a ceramic material.

5. A light deflecting apparatus comprising:
   a rotor portion comprising one of a shaft and a sleeve, said shaft being fitted into said sleeve so as to be capable of relative rotation between said shaft and said sleeve;
   a stator portion comprising the other of said shaft and said sleeve;
   a deflector mounted on said rotor portion for deflecting and scanning a light beam;
   a first permanent magnet mounted on the end portion of said sleeve;
   a second permanent magnet mounted on the end portion of said shaft so as to be opposed to said first permanent magnet in a direction perpendicular to an axial direction; and
   a cover mounted on said first permanent magnet to cover the second permanent magnet mounting end portion of said shaft, wherein said cover and said first permanent magnet envelope the space formed between said cover and the second permanent magnet mounting end portion of said shaft so as to form an air pool.

6. A light deflecting apparatus according to claim 5, wherein said deflector is a rotatable polygon mirror.

7. A light deflecting apparatus according to claim 5, wherein said rotor portion is floated up relative to said stator portion by a magnetic force working between said first permanent magnet and said second permanent magnet.

8. A light deflecting apparatus according to claim 5, wherein said rotor portion is a rotatable sleeve, and said stator portion is a fixed shaft.

9. A light deflecting apparatus according to claim 5, wherein said shaft and said sleeve are formed of a ceramic material.

10. A deflecting-scanning apparatus comprising:

a light source;

a rotor portion comprising one of a shaft and a sleeve, said shaft being fitted into said sleeve so as to be capable of relative rotation between said shaft and said sleeve;

a stator portion comprising the other of said shaft and said sleeve;

a deflector mounted on said rotor portion for deflecting and scanning a light beam from said light source;

a first permanent magnet mounted on said end portion of said sleeve;

a second permanent magnet mounted on the end portion of said shaft so as to be opposed to said first permanent magnet in a direction perpendicular to an axial direction; and a cover mounted on said first permanent magnet to cover the second permanent magnet mounting end portion of said shaft, wherein said cover and said first permanent magnet envelope the space formed between said cover and the second permanent magnet mounting end portion of said shaft so as to form an air pool.

11. A deflecting-scanning apparatus according to claim 10, wherein said deflector is a rotatable polygon mirror.

12. A deflecting-scanning apparatus according to claim 10, wherein said rotor portion is floated up relative to said stator portion by a magnetic force working between said first permanent magnet and said second permanent magnet.

13. A deflecting-scanning apparatus according to claim 10, wherein said rotor portion is a rotatable sleeve, and said stator portion is a fixed shaft.

14. A deflecting-scanning apparatus according to claim 10, wherein said shaft and said sleeve are formed of a ceramic material.

15. An image forming apparatus comprising:

a light source;

a recording medium;

a rotor portion comprising one of a shaft and a sleeve, said shaft being fitted into said sleeve so as to be capable of relative rotation between said shaft and said sleeve;

a stator portion comprising the other of said shaft and said sleeve;

a deflector mounted on said rotor portion for deflecting and scanning a light beam from said light source;

a first permanent magnet mounted on said end portion of said sleeve;

a second permanent magnet mounted on the end portion of said shaft so as to be opposed to said first permanent magnet in a direction perpendicular to an axial direction; and a cover mounted on said first permanent magnet to cover the second permanent magnet mounting portion of said shaft, wherein said cover and said first permanent magnet envelope the space formed between said cover and the second permanent magnet mounting end portion of said shaft so as to form an air pool.

16. An image forming apparatus according to claim 15, wherein said deflector is a rotatable polygon mirror.

17. An image forming apparatus according to claim 15, wherein said rotor portion is floated up relative to said stator portion by a magnetic force working between said first permanent magnet and said second permanent magnet.

18. An image forming apparatus according to claim 15, wherein said rotor portion is a rotatable sleeve, and said stator portion is a fixed shaft.

19. An image forming apparatus according to claim 15, wherein said shaft and said sleeve are formed of a ceramic material.

* * * * *

UNITED STATES PATENT AND TRADEMARK OFFICE
CERTIFICATE OF CORRECTION

PATENT NO. : 6,392,771 B1
DATED : May 21, 2002
INVENTOR(S) : Taku Fukita et al.

It is certified that error appears in the above-identified patent and that said Letters Patent is hereby corrected as shown below:

Column 1,
Line 67, "binders" should read -- hinders --.

Column 5,
Line 33, "optic al" should read -- optical --.

Signed and Sealed this

Twenty-sixth Day of November, 2002

Attest:

JAMES E. ROGAN
Attesting Officer     Director of the United States Patent and Trademark Office